(12) United States Patent
Ghobrial et al.

(10) Patent No.: US 7,809,076 B1
(45) Date of Patent: Oct. 5, 2010

(54) ADAPTIVE INTERFERENCE CANCELING SYSTEM AND METHOD

(75) Inventors: Ayman Ghobrial, San Diego, CA (US); Michael D. Turner, Huntsville, AL (US); Daniel M. Joffe, Owens Crossroads, AL (US)

(73) Assignee: ADTRAN, Inc., Huntsville, AL (US)

( * ) Notice: Subject to any disclaimer, the term of this patent is extended or adjusted under 35 U.S.C. 154(b) by 751 days.

(21) Appl. No.: 11/373,841

(22) Filed: Mar. 11, 2006

Related U.S. Application Data

(60) Provisional application No. 60/660,937, filed on Mar. 11, 2005.

(51) Int. Cl.
  H04L 25/03 (2006.01)
  H04M 1/76 (2006.01)
  H04M 7/00 (2006.01)

(52) U.S. Cl. .................. 375/285; 375/296; 375/265; 379/414; 379/416

(58) Field of Classification Search .............. 375/254, 375/262, 265, 284, 285, 296, 321, 301, 340, 375/341, 325, 324; 379/414, 416, 399.01, 379/402, 410, 406

See application file for complete search history.

(56) References Cited

U.S. PATENT DOCUMENTS

| | | | |
|---|---|---|---|
| 3,374,435 A | | 3/1968 | Engel |
| 3,825,843 A | | 7/1974 | Felsberg et al. |
| 4,527,261 A | | 7/1985 | Smither |
| 4,587,620 A | | 5/1986 | Niimi et al. |
| 4,914,398 A | | 4/1990 | Jove et al. |
| 5,221,909 A | * | 6/1993 | Cole ........................ 330/253 |
| 5,410,264 A | | 4/1995 | Lechleider |
| 5,832,032 A | * | 11/1998 | Overbury ................... 375/285 |
| 5,995,566 A | * | 11/1999 | Rickard et al. ............. 375/346 |
| 6,052,420 A | * | 4/2000 | Yeap et al. ................ 375/346 |
| 6,539,344 B1 | * | 3/2003 | Stengel et al. ................ 703/2 |
| 6,546,057 B1 | * | 4/2003 | Yeap ........................ 375/285 |
| 6,683,855 B1 | | 1/2004 | Bordogna et al. |
| 6,940,973 B1 | * | 9/2005 | Yeap et al. ................ 379/416 |
| 7,302,461 B2 | * | 11/2007 | Mukherjee et al. .......... 708/819 |
| 7,315,592 B2 | * | 1/2008 | Tsatsanis et al. ............ 375/346 |
| 7,433,399 B2 | * | 10/2008 | Bhattacharjee et al. ...... 375/232 |
| 7,443,783 B2 | * | 10/2008 | DeChamps et al. ......... 370/208 |
| 7,593,494 B1 | * | 9/2009 | Ghobrial et al. ............. 375/350 |

(Continued)

OTHER PUBLICATIONS

U.S. Appl. No. 10/460,968 entitled "Echo-Canceler for Precoded Fractionally Spaced Receiver Using Signal Estimator," filed Jun. 13, 2003.

(Continued)

*Primary Examiner*—David C Payne
*Assistant Examiner*—Linda Wong
(74) *Attorney, Agent, or Firm*—Lanier Ford Shaver & Payne, P.C.; Jon E. Holland

(57) ABSTRACT

A communication system adaptively cancels noise and/or interference from signals communicated through a communication channel, such as signals communicated by a telecommunication network. The system, based on a common mode signal of a received signal, generates an estimate of noise or interference within a differential mode signal of the received signal. The system then subtracts the estimate from the differential mode signal in an effort to remove noise from the differential mode signal thereby providing a differential mode signal that is substantially free of the estimated noise or interference.

17 Claims, 6 Drawing Sheets

U.S. PATENT DOCUMENTS

| | | | |
|---|---|---|---|
| 2001/0050987 A1* | 12/2001 | Yeap et al. | 379/399.01 |
| 2002/0141494 A1* | 10/2002 | Chappell | 375/228 |
| 2003/0118088 A1 | 6/2003 | Tzannes et al. | |
| 2003/0189998 A1* | 10/2003 | Phanse et al. | 375/348 |
| 2005/0053229 A1* | 3/2005 | Tsatsanis et al. | 379/406.01 |
| 2005/0114428 A1* | 5/2005 | Mukherjee et al. | 708/819 |

OTHER PUBLICATIONS

J.W. Lechleider, "An Adaptive Impulse Noise Canceler for Digital Subscriber Lines," Global Telecommunications Conference, 1992.

Odling, et al., "An Approach to Analog Mitigation of RFI," IEEE Journal on Selected Areas in Communications, vol. 20, No. 5, Jun. 2002.

Yeap, et al., "A Novel Common-Mode Noise Cancellation Technique for VDSL Applications," IEEE Transactions on Instrumentation and Measurement, vol. 52, No. 4, Aug. 2003.

U.S. Appl. No. 10/948,492 entitled "System and Method for Canceling Impulse Noise," filed Sep. 23, 2004.

* cited by examiner

ADAPTIVE INTERFERENCE CANCELING SYSTEM AND METHOD

CROSS REFERENCE TO RELATED APPLICATION

This application claims priority to U.S. Provisional Application No. 60/660,937, entitled "Adaptive Interference Canceling System and Method," and filed on Mar. 11, 2005, which is incorporated herein by reference.

RELATED ART

Noise and interference on a telecommunication line corrupt signal quality and limit the overall speed at which data can be successfully communicated over the telecommunication line. One type of noise, referred to as "impulse noise," is characterized by high amplitude levels of short duration. Due to the high amplitude levels associated with impulse noise, data bits corrupted by a burst of impulse noise cannot normally be recovered merely using conventional filtering techniques.

One type of interference, referred to as "radio frequency (RF) interference," is characterized by high amplitude levels of relatively long duration as compared to impulse noise. Whereas an occurrence of impulse noise can affect a wide range of frequencies, an occurrence of RF interference (RFI) induced by a particular source, sometimes referred to as an "interferer," normally affects a relatively narrow frequency band. An example of an RF interferer is an amplitude modulated (AM) radio station. Signals communicated by such a radio station can significantly interfere with the signals communicated by a telecommunication network. Although RFI from a single interferer usually affects a narrow frequency band, it is possible for RFI from multiple interferers to cumulatively affect a significant range of frequencies.

Another type of interference, referred to as "crosstalk," is generated by signals communicated along telecommunication lines within a close proximity of each other. For example, it is common for a telecommunication service provider to bundle several telecommunication lines within a single cable. Each of the telecommunication lines within the cable communicates different signals, and it is possible for energy from any one of the telecommunication lines to affect signals communicated over another of the telecommunication lines.

Various other types of noise and interference can affect a signal transmitted along a channel, such as a telecommunication line, and adaptive filtering techniques have typically been employed in an effort to reduce the amount of noise and interference present in a received signal. In this regard, a received signal is passed through a filter bank or an adaptive filter, which adjusts different frequency ranges of the received signal in an effort to remove the interference. An error signal measured after the filtering is typically provided as feedback to an adaptive filter. Using various known algorithms, such as least mean squares (LMS), the adaptive filter may be updated based on the error feedback in an effort to reduce the amount of error in the filtered signals thereby compensating for the errors induced by noise and interference from the communication channel. However, noise and interference from a channel may change over time, and conventional filtering techniques are often unable to sufficiently reduce the effects of such noise and interference. Furthermore, if conventional filters remove frequency bands, these frequency bands are unavailable on the telecommunication line, reducing performance and creating distortion.

In an effort to cancel RFI in some systems, a common mode input from a communication channel is passed through a wideband adaptive filter, as described in Yeap et al., "A Novel Common-Mode Noise Cancellation Technique for VDSL Applications," I.E.E.E. Transactions on Instrumentation and Measurement, Vol. 52, No. 4, August 2003. The adaptive filter attempts to model interference in the time domain and cancel it by subtracting the time domain interference replica from the differential signal path, which carries the desired signal plus the interference. After the point of cancellation, a time domain error signal is measured and provided as feedback to the adaptive filter, which is adapted using the time domain error signal in conjunction with various known algorithms, such as the LMS algorithm. However, noise and interference change over time, and conventional cancellation techniques are often unable to sufficiently reduce the effects of such noise and interference. In the case of impulse noise, many different sources may produce many different impulse shapes, defeating simple cancellation schemes. In the case of RFI, crosstalk, and other noise, there are other factors severely limiting the accuracy and responsiveness of time domain cancellation methods.

For example, the time domain error signal recovered after the point of cancellation includes the desired signal, which is normally the largest signal present at this point. The desired signal acts as a source of noise and interference for the error signal used to adaptively update the cancellation filter, severely limiting the speed and the accuracy with which the adaptive filters can converge or respond to any changes in the interference. Furthermore, the large adaptive time domain filters used for such cancellation structures typically perform a large number of numerical operations for every received time domain sample, resulting in very high system complexity and cost.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to systems and methods for adaptively canceling noise and/or interference from signals communicated through a communication channel, such as signals communicated by a telecommunication network. A system in accordance with one exemplary embodiment of the present disclosure, based on a common mode signal of a received signal, generates an estimate of noise or interference within a differential mode signal of the received signal. The system then subtracts the estimate from the differential mode signal in an effort to remove noise from the differential mode signal thereby providing a differential mode signal that is substantially free of the estimated noise or interference.

Figure 1:
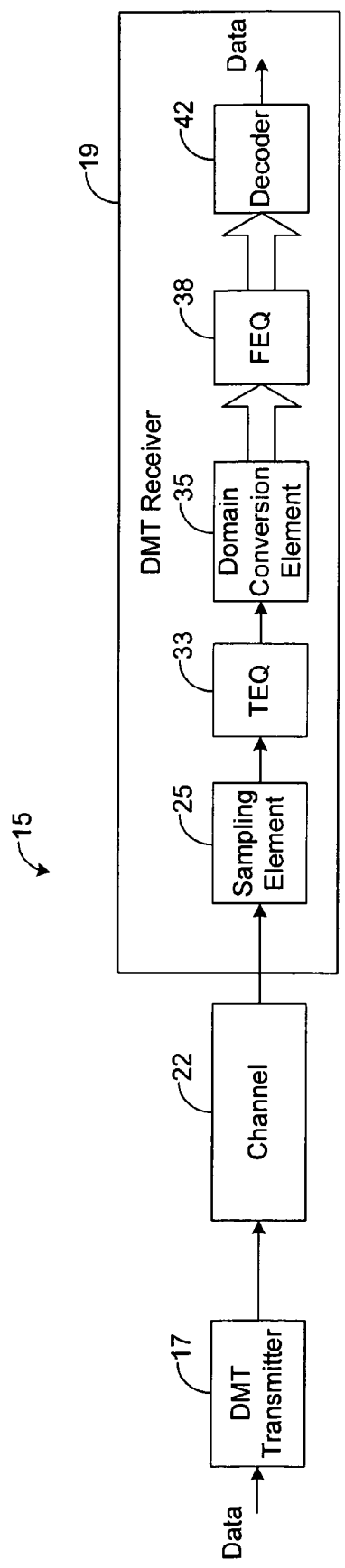
FIG. 1 is a block diagram illustrating a discrete multi-tone (DMT) communication system of the prior art.

FIG. 1 shows a conventional communication system 15 employing a discrete multi-tone (DMT) transmitter 17 and a DMT receiver 19 communicating over a communication channel 22, such as an unshielded twisted pair (UTP). The DMT transmitter 17 encodes a signal with data that is to be communicated to the receiver 19. Both impulse noise and interference can couple through the channel 22 into the DMT receiver 19 and can adversely affect the receiver performance.

The DMT receiver 19 comprises a sampling element 25 for receiving and processing the encoded data signal. In this regard, the sampling element 25 converts the received signal from analog to digital and can perform various shaping and other processing of the received signal in accordance with techniques known in the art. The DMT receiver 19 also comprises a time domain equalizer (TEQ) 33 for equalizing the converted digital signal according to known techniques. A domain conversion element 35 converts the equalized digital signal into frequency domain vectors. In this regard, the element 35 preferably takes the Fast Fourier Transform (FFT) of the equalized digital signal to convert it into the frequency domain. A frequency domain equalizer (FEQ) 38 then equalizes the converted frequency domain vectors, and a decoder 42 decodes the equalized frequency domain vectors to generate a decoded data signal representing the data originally encoded at the transmitter 17. Note that the TEQ 33 is optional and may be removed from the system 15 in some applications.

Figure 2:
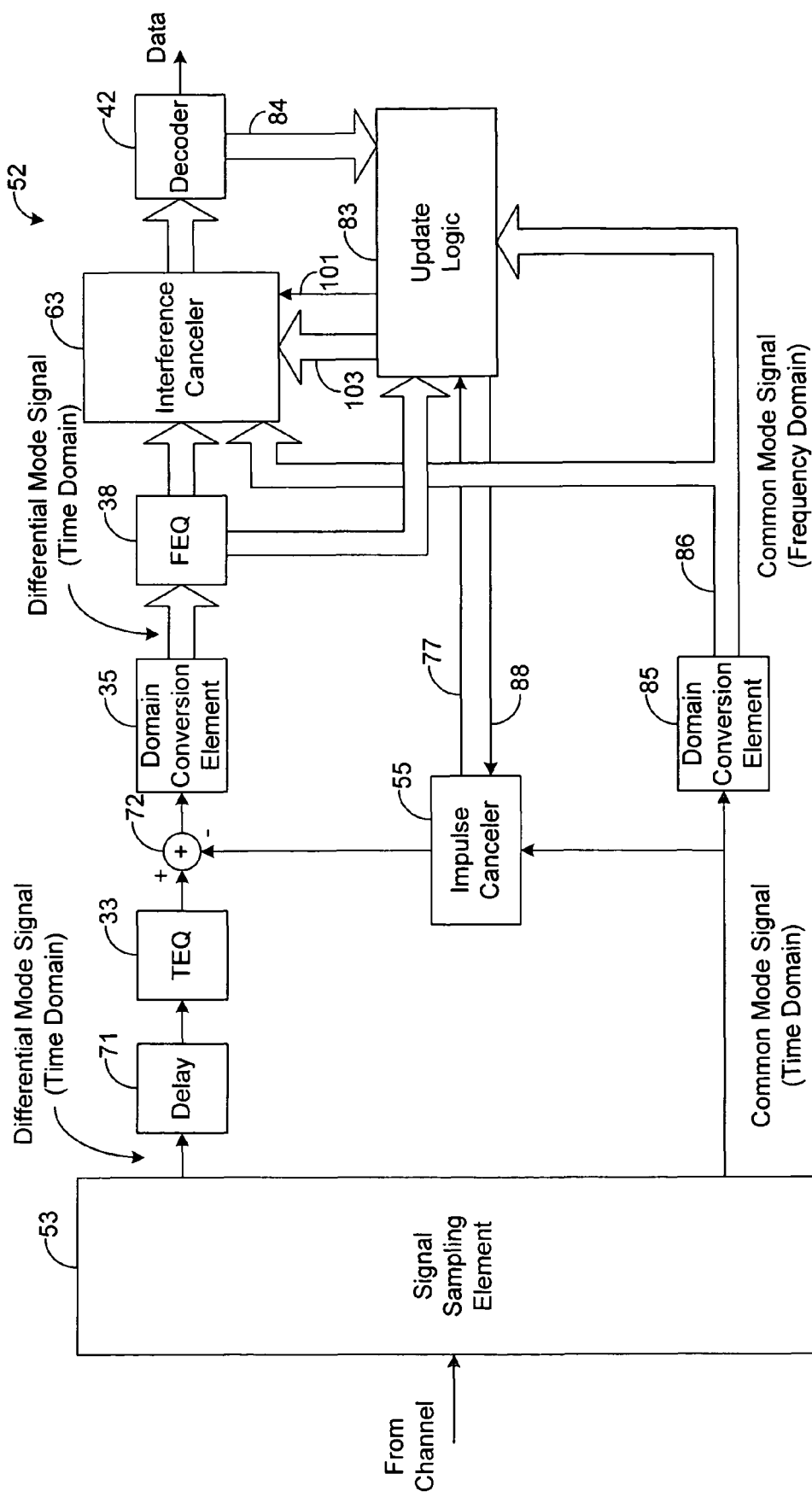
FIG. 2 is a block diagram illustrating an exemplary DMT communication system in accordance with the present disclosure.

FIG. 2 shows a DMT receiver 52 in accordance with an exemplary embodiment of the present disclosure. The DMT receiver 52 may be used in the communication system 15 of FIG. 1 in lieu of the conventional DMT receiver 19. As can be seen by comparing FIGS. 1 and 2, the DMT receiver 52 comprises many of the same components as the conventional DMT receiver 19.

Figure 3:
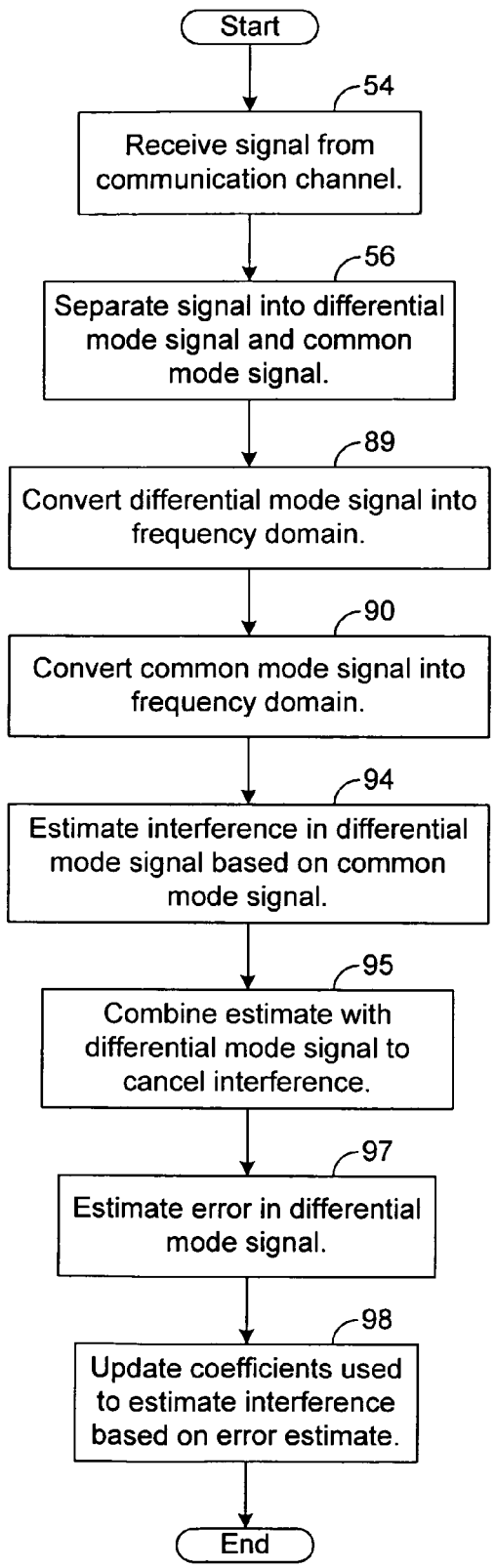
FIG. 3 is a flow chart illustrating en exemplary method for adaptively canceling interference from a signal received by a receiver, such as is depicted in FIG. 2.

As shown by FIG. 2, the DMT receiver 52 comprises a signal sampling element 53 that is configured to receive the signal being communicated over the channel 22, as depicted by block 54 of FIG. 3. The element 53 performs various processing of this signal similar to the sampling element 25 of FIG. 1, including converting the signal from analog to digital. The element 53 also separates the signal into a differential mode signal, also referred to herein as simply "differential signal," and a common mode signal, as depicted by block 56 of FIG. 3. An exemplary configuration of the element 53 will be described in more detail hereinbelow.

Based on the digital common mode signal, the impulse canceler 55 estimates an amount of impulse noise within the digital differential signal and provides an impulse cancellation signal indicative of this estimate. In one exemplary embodiment, the impulse canceler 55 models the impulses caused by different interferers in the time domain and establishes, for each unique impulse, a unique set of filter coefficients. When the impulse canceler 55 later detects a particular impulse in the common mode path, the impulse canceler 55 retrieves the coefficients associated with this impulse and uses these coefficients to filter the impulse in the common mode signal. The filtered signal is then provided to the combiner 72 as the cancellation signal for canceling the corresponding impulse in the differential mode signal received by the combiner 72. Exemplary techniques for estimating and canceling impulse noise pursuant to the foregoing embodiment are described in more detail in U.S. patent application Ser. No. 10/948,492, entitled "System and Method for Canceling Impulse Noise," and filed on Sep. 23, 2004, which is incorporated herein by reference.

In a differential signal path, the digital differential signal output from the sampling element 53 is delayed by a delay element 71. Using known or future-developed equalization techniques, the TEQ 33 equalizes the delayed differential signal to generate an equalized differential signal. A combiner 72 at the output of the TEQ 33 subtracts the output of the impulse canceler 55 (i.e., the impulse cancellation signal) from the differential mode signal received from the TEQ 33 to generate a signal that is substantially free of impulse noise. Note that the amount of delay introduced by the delay element 71 is preferably sufficient for allowing the impulse canceler 55 to generate the impulse cancellation signal so that the digital differential signal and the impulse cancellation signal (representing the estimate of impulse noise within the digital differential signal) are concurrently received by the combiner 72.

The impulse canceler 55 is configured to provide an output signal 77 indicative of when the impulse canceler 55 is actively canceling impulse noise (i.e. when its output is different from null). In this regard, the output signal 77 indicates when the impulse canceler 55 has successfully detected impulse noise within the digital common mode signal and is outputting an estimate of the detected impulse noise. The impulse canceler 55 is updated using an update signal 88 provided by update logic 83, as will be further described below.

The domain conversion element 35 converts the signal from the combiner 72 into frequency domain differential vectors, as depicted by block 89 of FIG. 3. In this regard, the domain conversion element 35 preferably takes the FFT of the differential mode signal from combiner 72 to convert this signal from the time domain to the frequency domain. The FEQ 38 equalizes the converted frequency domain signal, and the FEQ 38 also provides a copy of the current FEQ coefficients to the update logic 83. The digital common mode signal is also converted into frequency domain common mode vectors by a domain conversion element 85, thereby forming a common mode signal 86 in the frequency domain, as depicted by block 90 of FIG. 3. In this regard, the domain conversion element 85 preferably takes the FFT of the digital common mode signal received from element 53 to convert this signal from the time domain to the frequency domain.

As depicted by blocks 94 and 95 of FIG. 3, the interference canceler 63 generates an estimate of the interference in the differential mode signal and subtracts the generated interference estimate from the differential mode signal received from FEQ 38, thereby providing frequency domain differential vectors that are substantially free of interference, as will be further described below. The decoder 42 decodes the vectors of the frequency domain differential mode signal from the interference canceler 63 and generates a decoded data signal representing the data originally encoded by the transmitter 17. As depicted by blocks 97 and 98 of FIG. 3, the decoder 42 also generates an error signal 84 in the frequency domain to be used by the update logic 83 to generate update signals for the impulse canceler 55 and the interference canceler 63, as will be further described below. The update logic 83 also receives the vectors of the frequency domain common mode signal 86, as well as the signal 77 indicative of whether the impulse canceler 55 is active.

The update logic 83 generates an update signal 88 for the impulse canceler 55 by vector-dividing the decoder error signal 84 by the FEQ coefficients from FEQ 38 and taking the inverse Fast Fourier Transform (IFFT) of the result. The update logic 83 also generates an enable signal 101 and a signal 103 that defines updated coefficients for the interference canceler 63. The enable signal 101 disables the interference canceler 63 when appropriate. When disabled, the interference canceler 63 passes the differential signal from the FEQ 38 without alteration. For example, the update logic 83 may be configured to disable the interference canceler 63 via the signal 101 in certain cases when the signal 77 is indicating that the impulse canceler 55 is active (i.e., providing an estimate of impulse noise in the differential signal).

The update logic 83 may analyze the decoder error signal 84 and the frequency domain common mode signal 86 in order to determine whether to enable the interference canceler 63. For example, if the logic 83, based on the signals 84 and 86, determines that the differential mode signal being received by the interference canceler 63 includes interference that may be mitigated by the interference canceler 63, the logic 86 may be configured to enable the interference canceler 63. However, the logic 83 may be configured to disable the interference canceler 63 when it determines, based on signal 77, that the interference canceler 63 is receiving a differential mode signal that has been compensated for impulse noise by the impulse canceler 55. In such a situation, the common mode signal being received by the interference canceler 63 may be severely corrupted with impulse noise. In an alternative embodiment, the interference canceler 63 may be continuously enabled regardless of the state of the common mode signal or the differential mode signal being received by the interference canceler 63. Various algorithms for controlling the activation state of the interference canceler 63 are possible.

While the interference canceler 63 is enabled; the update logic 83 preferably produces signal 103 defining updated coefficients for the interference canceler 63 such that the interference at the input to the decoder 42 is minimized. To produce the updated coefficients, the update logic 83 uses one or more known optimization algorithms, such as, for example, frequency domain Least Mean Squares (LMS), frequency domain Recursive Least Squares (RLS), etc. Because the error signal 84 defines the residual error after removal of the desired received signal, the error signal 84 is dominated by the information used by the update algorithms, rather than by the desired received signal. This undistorted error signal 84 enables rapid, accurate canceler convergence, as well as accurate, rapid tracking of changes in any interference source, such as one or more sources of RFI and/or crosstalk, for example.

In some embodiments, the update logic 83 may store multiple sets of generated coefficient vectors in memory, in association with different types of identified interference. This activity allows those coefficients to become readily available without a need for re-learning, when the same type interference is identified at a later time, allowing interference cancellation to respond more rapidly to changing interference environments. The update logic 83 also may combine different updated coefficient vectors into a current updated coefficient vector to improve the interference canceler performance in some cases.

Note that the update logic 83 can be implemented in hardware, software, or a combination thereof. In one exemplary embodiment, the logic 83 is implemented in hardware (e.g., logic gates). In embodiments for which the logic 83 or other components of the receiver 52 are implemented in software, the receiver 52 may include at least one instruction execution apparatus (not shown), such as a microprocessor, to execute instructions of the software.

Figure 4:
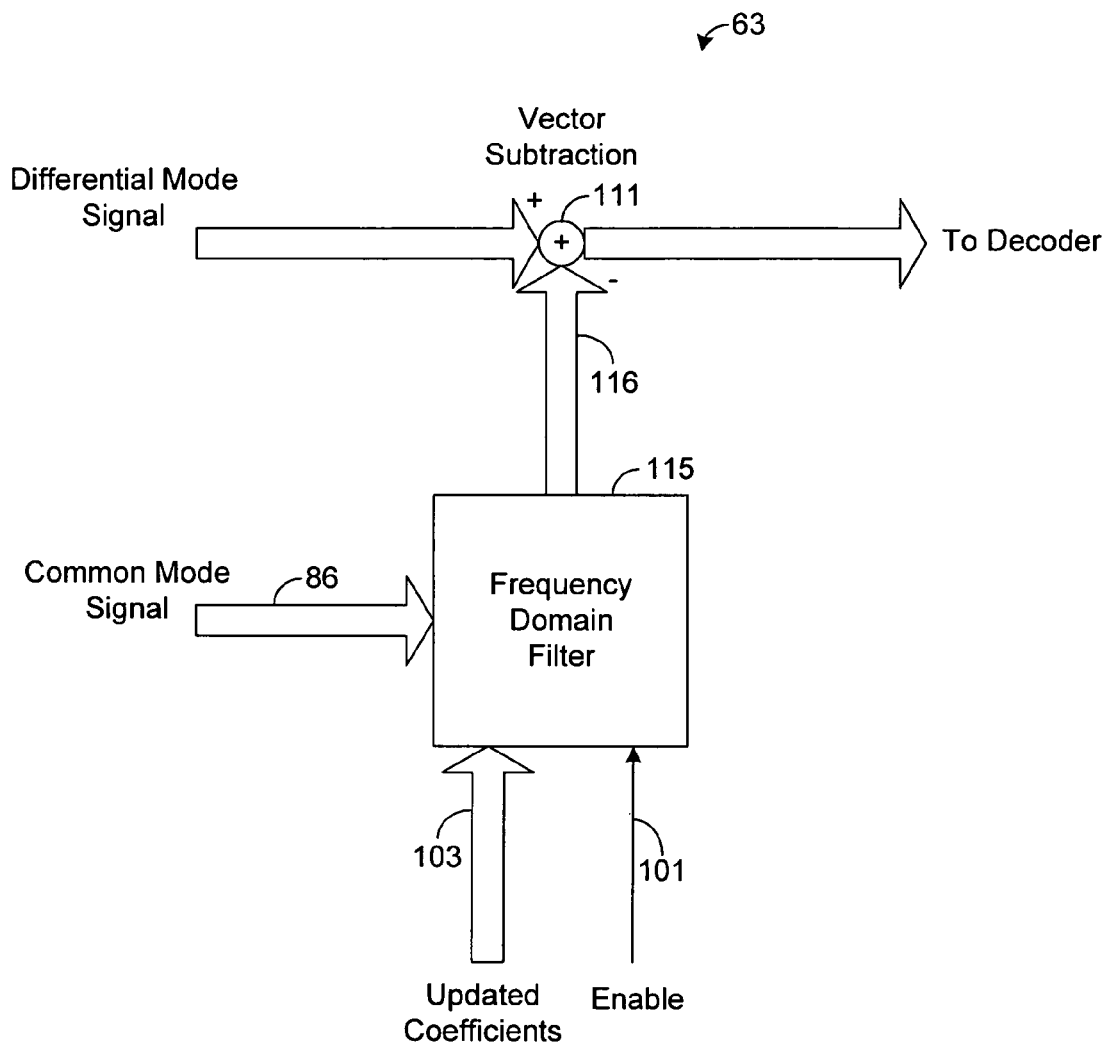
FIG. 4 is a block diagram illustrating an exemplary interference canceler, such as is depicted in FIG. 2.

FIG. 4 shows an exemplary interference canceler 63. The interference canceler 63 of FIG. 4 comprises a combiner 111 and an adaptive frequency domain filter 115. The activation state of the frequency domain filter 115 is controlled by the enable signal 101. When disabled by the signal 101, the output 116 of the frequency domain filter 115 is set to the zero vector. When enabled by the signal 101, the frequency domain filter 115 uses the vectors of the common mode signal 86 to generate an output 116 representing an estimate of the interference in the frequency domain differential signal from the FEQ 38. In this regard, the filter 115 filters the common mode signal 86 based on filter coefficients generated and loaded by the update logic 83 (FIG. 3). The combiner 111 subtracts the generated interference estimate from the frequency domain differential signal, thereby providing, to the decoder 42 (FIG. 2), a frequency domain differential signal that is substantially free of interference.

Figure 5:
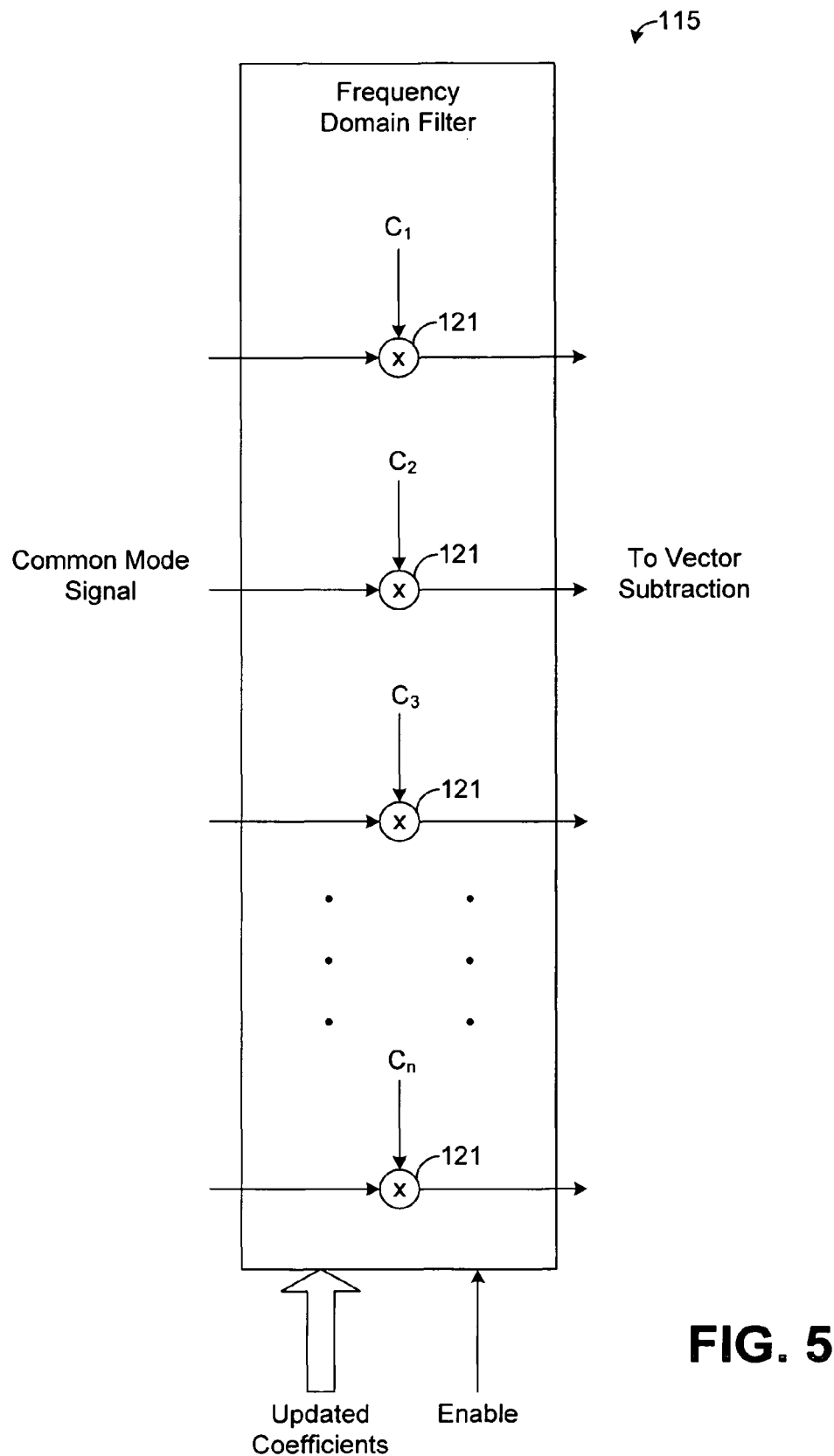
FIG. 5 is a block diagram illustrating an exemplary frequency domain filter, such as is depicted in FIG. 4.

FIG. 5 shows a more detailed view of the frequency domain filter 115. As shown by FIG. 5, the frequency domain filter 115 comprises a plurality of multipliers 121, each of which multiplies a respective frequency domain coefficient with the corresponding vector element in the common mode signal 86. The adaptive frequency domain filter 115 requires far less implementation complexity than adaptive time domain filtering. The desired number of multipliers 121 in FIG. 5 is equal to the number of input vector elements in the common mode signal 86, which is generally comparable to or less than the number of time domain samples produced by the signal sampling element 53 in FIG. 2 for a similar signal span in the common mode path. A hypothetical adaptive time domain filter operating on the same time domain sample set produced by the element 53 would perform a large number of multiplication operations to be applied to every time domain sample. Therefore, using the frequency domain filter 115 to cancel various interference, such as RFI and/or crosstalk, is dramatically more efficient than using a time domain filter to perform the same function. However, given the typically short duration of impulse noise bursts, it is nevertheless generally advantageous to cancel impulse noise in the time domain via the impulse canceler 55, as shown by FIG. 2.

Figure 6:
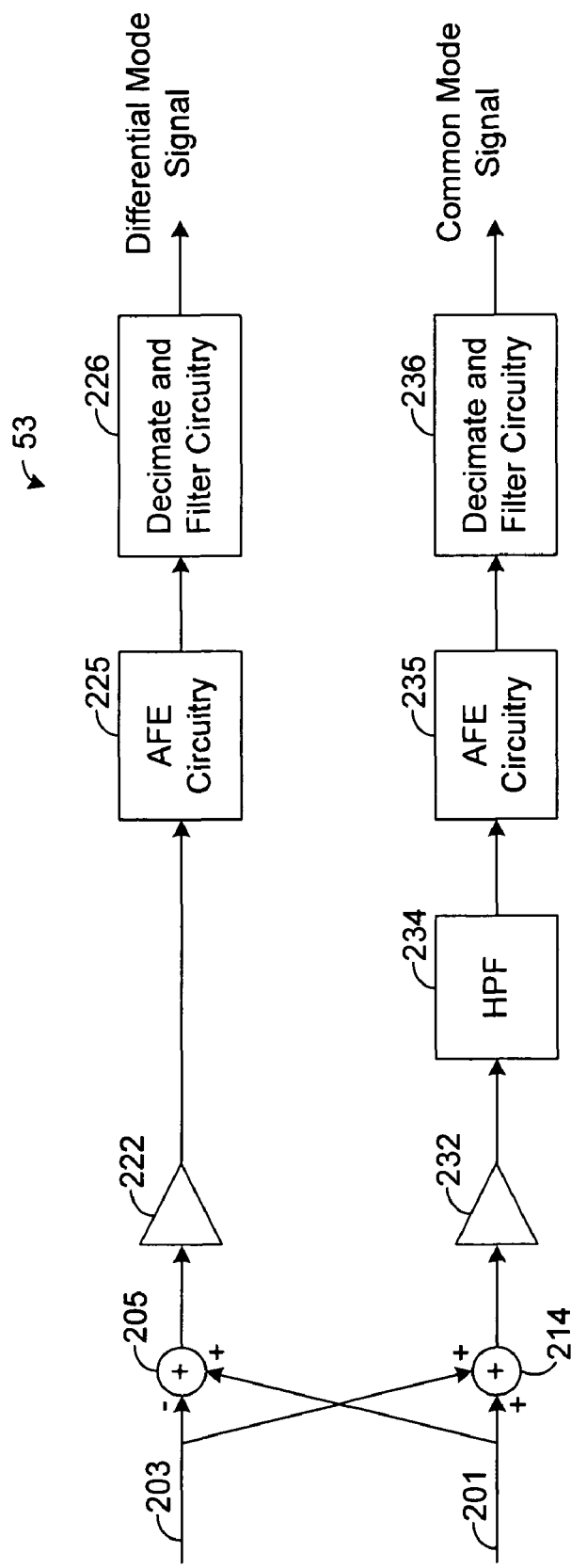
FIG. 6 is block diagram illustrating an exemplary signal sampling element, such as is depicted in FIG. 2.

Note that various configurations of the signal sampling element 53 are possible. As shown by FIG. 6, the signal sampling element 53, in one exemplary embodiment, is coupled to a pair of communication connections 201 and 203, respectively referred to as "tip" and "ring," of a telecommunication line used to implement the channel 22. A combiner 205 subtracts the voltage of ring 203 from the voltage of tip 201 in order to provide a differential mode signal, which is received and amplified by an amplifier 222. The amplified differential signal then passes through analog front end (AFE) circuitry 225 and decimate and filter circuitry 226. The AFE circuitry 225 converts the amplified signal from analog to digital. The circuitry 226 then decimates and filters the digital signal to provide the differential mode signal that is transmitted to the delay element 71 of FIG. 2.

A combiner 214 adds the voltages of tip 201 and ring 203 in order to provide a common mode signal, which is received and amplified by amplifier 232. The amplified common mode signal then passes through a high-pass (HPF) filter 234, analog front end (AFE) circuitry 235, and decimate and filter circuitry 236. The high-pass filter 234 filters low frequency noise from the amplified signal, and the AFE circuitry 235 converts the filtered signal from analog to digital. The circuitry 236 then decimates and filters the digital signal to provide the common mode signal that is transmitted to the impulse canceler 55 and domain conversion element 85 of FIG. 2.

It should be noted that the aforedescribed embodiments of the receiver 52 are exemplary and various modifications may be made to the embodiments without substantially departing from the spirit and principles of the disclosure. As a mere example, the aforedescribed embodiments have been described, for exemplary purposes, in the context of a DMT communication system. However, it is possible to implement similar functionality for canceling noise and interference in other types of communication systems as well.

For example, similar functionality might be applied directly to other multi-tone or multi-band systems, such as orthogonal frequency domain multiplex (OFDM) systems. In other systems that ordinarily do not employ frequency domain methods, block processing with FFT and IFFT functions might be incorporated to allow implementation of similar cancellation functionality. In this regard, a received signal might be converted from the time domain into the frequency domain in order to allow for interference canceling by an interference canceler 63, as described above, and after interference cancellation, the signal may be converted back into the time domain for other processing. Other embodiments might include the impulse canceler 55 without the interference canceler 63, or they might include the interference canceler 63 without the impulse canceler 55. Neither of these elements is dependent upon the other, so they may be employed independently or both together. Various other changes and modifications would be apparent to one of ordinary skill in the art upon reading this disclosure.

Now, therefore, the following is claimed:

1. An apparatus for adaptively canceling interference from communication signals, comprising:

a sampling element configured to receive a data signal from a first communication connection and a second communication connection of a telecommunication line coupled to the sampling element, the sampling element configured to separate the data signal into a differential mode signal and a common mode signal, wherein the differential mode signal represents a difference between a first voltage of the first communication connection and a second voltage of the second communication connection, and wherein the common mode signal represents a sum of the first and second voltages;

a first domain conversion element configured to receive the differential mode signal and to convert the differential mode signal from time domain to frequency domain;

a second domain conversion element configured to receive the common mode signal and to convert the common mode signal from time domain to frequency domain;

an adaptive interference canceler configured to receive the common mode signal in the frequency domain and to provide, based on the common mode signal in the frequency domain, an estimate of interference within the differential mode signal in the frequency domain, the adaptive interference canceler further configured to combine the estimate with the differential mode signal in the frequency domain, thereby reducing interference in the differential mode signal, wherein the adaptive interference canceler comprises at least one adaptive filter configured to filter the common mode signal in the frequency domain;

a decoder configured to receive the differential mode signal from the adaptive interference canceler and to decode the differential mode signal thereby providing a decoded signal defining data, the decoder configured to transmit an error signal indicative of an estimated error for the differential mode signal; and logic configured to update coefficients of the adaptive filter based on the error signal.

2. The apparatus of claim 1, wherein the adaptive interference canceler is configured to combine the estimate with the differential mode signal in the frequency domain by subtracting the estimate from the differential mode signal in the frequency domain.

3. The apparatus of claim 1, wherein the error signal does not define said data.

4. An apparatus for adaptively canceling interference from communication signals, comprising:

a first domain conversion element configured to receive a differential mode signal and to convert the differential mode signal from time domain to frequency domain;

a second domain conversion element configured to receive a common mode signal and to convert the common mode signal from time domain to frequency domain;

an adaptive interference canceler configured to receive the common mode signal in the frequency domain and to provide, based on the common mode signal in the frequency domain, an estimate of interference within the differential mode signal in the frequency domain, the adaptive interference canceler further configured to combine the estimate with the differential mode signal in the frequency domain, thereby reducing interference in the differential mode signal;

an adaptive impulse canceler configured to receive the common mode signal in the time domain and to detect a noise impulse in the common mode signal in the time domain, the adaptive impulse canceler further configured to provide, based on the noise impulse in the common mode signal, an impulse noise estimation for the differential mode signal in the time domain; and a combiner configured to receive the differential mode signal and the impulse noise estimation and to combine the impulse noise estimation with the differential mode signal in the time domain, thereby reducing impulse noise in the differential mode signal.

5. The apparatus of claim 4, wherein the first domain conversion element is configured to receive the differential mode signal from the combiner after the impulse noise estimation has been combined with the differential mode signal by the combiner.

6. The apparatus of claim 5, wherein the interference canceler comprises at least one adaptive filter configured to filter the common mode signal in the frequency domain, the apparatus further comprising:

a decoder configured to receive the differential mode signal from the adaptive interference canceler and to decode the differential mode signal thereby providing a decoded signal defining data, the decoder configured to transmit an error signal indicative of an estimated error for the differential mode signal, wherein the error signal does not define said data; and logic configured to update coefficients of the adaptive filter based on the error signal.

7. The apparatus of claim 6, further comprising an equalizer configured to receive the differential mode signal in the frequency domain from the first domain conversion element and to equalize vectors of the differential mode signal in the frequency domain based on a plurality of equalization coefficients, and wherein the logic is configured to combine the plurality of equalization coefficients with the error signal thereby providing a combined error signal, the logic further configured to transmit the combined error signal to the adaptive impulse canceler.

8. The apparatus of claim 7, wherein the adaptive impulse canceler is configured to filter the common mode signal in the time domain based on a plurality of filter coefficients, and wherein the adaptive impulse canceler is configured to update, based on the combined error signal, the plurality of filter coefficients.

9. An apparatus for adaptively canceling interference from communication signals, comprising:
 a sampling element configured to separate a signal received from a communication channel into a differential mode signal and a common mode signal;
 a first domain conversion element configured to receive the differential mode signal and to convert the differential mode signal from time domain to frequency domain;
 a second domain conversion element configured to receive the common mode signal and to convert the common mode signal from time domain to frequency domain;
 an adaptive interference canceler configured to adaptively filter the common mode signal in the frequency domain thereby providing a first filtered signal indicative of an estimate of interference within the differential mode signal, the adaptive interference canceler configured to combine the differential mode signal in the frequency domain and the first filtered signal, thereby removing interference from the differential mode signal; and
 an adaptive impulse canceler configured to receive the common mode signal in the time domain and to adaptively filter the common mode signal in the time domain thereby providing a second filtered signal indicative of an estimate of a noise impulse within the differential mode signal; and
 a combiner configured to combine the differential mode signal in the time domain and the second filtered signal thereby reducing impulse noise in the differential mode signal.

10. The apparatus of claim 9, wherein the adaptive interference canceler stores first filter coefficients for filtering the common mode signal in the frequency domain, the apparatus further comprising:
 a decoder configured to receive the differential mode signal from the adaptive interference canceler and to decode the differential mode signal thereby providing a decoded signal defining data, the decoder configured to transmit an error signal indicative of an estimated error for the differential mode signal, wherein the error signal does not define said data; and
 logic configured to update the first filter coefficients based on the error signal.

11. The apparatus of claim 10, wherein the adaptive impulse canceler stores second filter coefficients for filtering the common mode signal in the time domain, and wherein the adaptive impulse canceler is configured to update the second filter coefficients based on the error signal.

12. A method for adaptively canceling interference from communication signals, comprising:
 receiving a signal from a first communication connection of a telecommunication line and a second communication connection of the telecommunication line;
 separating the received signal into a differential mode signal and a common mode signal, wherein the differential mode signal represents a difference between a first voltage of the first communication connection and a second voltage of the second communication connection, and wherein the common mode signal represents a sum of the first and second voltages;
 converting the differential mode signal from time domain to frequency domain;
 converting the common mode signal from time domain to frequency domain;
 estimating, based on the common mode signal in the frequency domain, interference within the differential mode signal in the frequency domain, wherein the estimating comprises adaptively filtering, based on a first plurality of filter coefficients, the common mode signal in the frequency domain thereby providing a filtered signal indicative of the estimated interference;
 combining the filtered signal with the differential mode signal in the frequency domain, thereby reducing interference in the differential mode signal;
 decoding the differential mode signal after the combining, thereby providing a decoded signal defining data;
 transmitting an error signal based on the decoding, the error signal indicative of an estimated error in the differential mode signal; and
 updating the first plurality of filter coefficients based on the error signal.

13. The method of claim 12, wherein the combining comprises subtracting the filtered signal from the differential mode signal in the frequency domain.

14. The method of claim 12, wherein the error signal does not define said data.

15. A method for adaptively canceling interference from communication signals, comprising:
 receiving a signal from a communication channel;
 separating the received signal into a differential mode signal and a common mode signal;
 converting the differential mode signal from time domain to frequency domain;
 converting the common mode signal from time domain to frequency domain;
 estimating, based on the common mode signal in the frequency domain, interference within the differential mode signal in the frequency domain, wherein the estimating comprises adaptively filtering the common mode signal in the frequency domain based on a first plurality of filter coefficients thereby providing a first filtered signal indicative of the estimated difference;
 combining the estimated interference with the differential mode signal in the frequency domain, thereby reducing interference in the differential mode signal;
 adaptively filtering the common mode signal in the time domain thereby providing a second filtered signal indicative of an estimated noise impulse in the differential mode signal in the time domain;
 combining the second filtered signal with the differential signal in the time domain, thereby reducing impulse noise in the differential mode signal;
 decoding the differential mode signal after the combining, thereby providing a decoded signal defining data;
 transmitting an error signal based on the decoding, the error signal indicative of an estimated error in the differential mode signal, wherein the error signal does not define said data; and
 updating the first plurality of filter coefficients based on the error signal.

16. The method of claim 15, wherein the adaptively filtering the common mode signal in the time domain is based on a second plurality of filter coefficients, the method further comprising the step of updating the second plurality of filter coefficients based on the error signal.

17. An apparatus for adaptively canceling interference from communication signals, comprising:
 a sampling element coupled to a first communication connection of a telecommunication line and a second communication connection of the telecommunication line, the sampling element configured to separate a signal received from the first and second communication connections into a differential mode signal and a common mode signal, wherein the differential mode signal represents a difference between a first voltage of the first communication connection and a second voltage of the second communication connection, and wherein the common mode signal represents a sum of the first and second voltages;

a first domain conversion element configured to receive the differential mode signal and to convert the differential mode signal from time domain to frequency domain;

a second domain conversion element configured to receive the common mode signal and to convert the common mode signal from time domain to frequency domain; and an adaptive interference canceler configured to adaptively filter the common mode signal in the frequency domain thereby providing a filtered signal indicative of an estimate of interference within the differential mode signal, the adaptive interference canceler configured to combine the differential mode signal in the frequency domain and the filtered signal, thereby removing interference from the differential mode signal, wherein the adaptive interference canceler comprises an adaptive filter configured to filter the common mode signal in the frequency domain;

a decoder configured to receive the differential mode signal from the adaptive interference canceler and to decode the differential mode signal thereby providing a decoded signal defining data, the decoder configured to transmit an error signal indicative of an estimated error for the differential mode signal; and logic configured to update coefficients of the adaptive filter based on the error signal.

* * * * *